US011907236B2

(12) United States Patent
Barnes, II

(10) Patent No.: US 11,907,236 B2
(45) Date of Patent: *Feb. 20, 2024

(54) SYSTEMS AND METHODS FOR FUZZY SEARCH WITHOUT FULL TEXT

(71) Applicant: Cisco Technology, Inc., San Jose, CA (US)

(72) Inventor: Richard Lee Barnes, II, Arlington, VA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/811,543

(22) Filed: Jul. 8, 2022

(65) Prior Publication Data

US 2022/0342883 A1    Oct. 27, 2022

Related U.S. Application Data

(63) Continuation of application No. 16/535,157, filed on Aug. 8, 2019, now Pat. No. 11,386,101.

(51) Int. Cl.
*G06F 16/2458* (2019.01)
*G06F 16/21* (2019.01)
(Continued)

(52) U.S. Cl.
CPC ........ *G06F 16/2468* (2019.01); *G06F 16/219* (2019.01); *G06F 16/24562* (2019.01); *G06F 40/242* (2020.01)

(58) Field of Classification Search
CPC .............. G06F 16/2468; G06F 16/219; G06F 16/24562; G06F 40/242; G06F 16/3332;
(Continued)

(56) References Cited

U.S. PATENT DOCUMENTS 8,631,035 B2   1/2014   Li et al.
9,607,103 B2   3/2017   Anderson
(Continued)

FOREIGN PATENT DOCUMENTS

WO    2018122238 A1    7/2018

OTHER PUBLICATIONS

Besbes et al.: "Fuzzy ontologies for search results diversification: application to medical data"; SAC '18; Proceedings of the 33rd Annual AM Symposium on Applied Computing; pp. 1968-1975 (year: 2018).

(Continued)

*Primary Examiner* — Mark D Featherstone
*Assistant Examiner* — Kweku William Halm
(74) *Attorney, Agent, or Firm* — Polsinelli P.C.

(57) ABSTRACT

Systems, methods, and computer-readable media for fuzzy-searches on encrypted messages include maintaining, in an indexer, a dictionary of words appearing in a message history. Upon receiving a query including at least one search term, a fuzzy search of the dictionary using the at least one search term is performed to determine one or more fuzzy-matching words in the dictionary, and one or more search tokens are generated from the one or more fuzzy-matching words, the one or more search tokens including encrypted versions of the one or more fuzzy-matching words. The one or more search tokens are provided to a search service for searching a database of encrypted messages of the message history, where the at least one search term may not have an exact match with any of the words in the dictionary.

20 Claims, 5 Drawing Sheets

(51) Int. Cl.
*G06F 16/2455* (2019.01)
*G06F 40/242* (2020.01)

(58) Field of Classification Search
CPC ............... G06F 16/3349; G06F 21/602; G06F 21/6245; G06F 16/3346
See application file for complete search history.

(56) References Cited

U.S. PATENT DOCUMENTS

| | | | |
|---|---|---|---|
| 2009/0254516 A1* | 10/2009 | Meiyyappan | G06F 16/134 |
| | | | 707/999.005 |
| 2009/0254572 A1 | 10/2009 | Redlich | |
| 2012/0078914 A1 | 3/2012 | Roeder | |
| 2013/0138688 A1 | 5/2013 | Anderson | |
| 2013/0262485 A1 | 10/2013 | Li et al. | |
| 2016/0005143 A1 | 1/2016 | Liu | |
| 2016/0055143 A1 | 2/2016 | Goel et al. | |
| 2017/0024657 A1 | 1/2017 | Sahu | |
| 2017/0103110 A1 | 4/2017 | Winstanley | |
| 2017/0103217 A1 | 4/2017 | Arasu | |
| 2017/0177672 A1 | 6/2017 | Geissinger | |
| 2020/0125501 A1 | 4/2020 | Durham | |
| 2020/0125563 A1 | 4/2020 | Fan | |
| 2020/0344218 A1 | 10/2020 | Mulayin | |

OTHER PUBLICATIONS

Wang et al.: "Extending string similarity hoin to tolerant fuzzy token matching"; ACM Transactions on Database Systems vol. 39 Issue; Jan. 1, 2014; Article No. 7; pp. 1-45; https://doi.org/10.1145/2535628 (year 2014).

\* cited by examiner

SYSTEMS AND METHODS FOR FUZZY
SEARCH WITHOUT FULL TEXT

CROSS-REFERENCES TO RELATED
APPLICATIONS

This application is a continuation of U.S. application Ser. No. 16/535,157, filed on Aug. 8, 2019, which is hereby incorporated by reference, in its entirety and for all purposes.

TECHNICAL FILED

The subject matter of this disclosure relates in general to the field of cloud computing, and more particularly to performing fuzzy searches in a database maintained by a cloud service.

BACKGROUND

Enterprise software or enterprise application software (EAS) refers to computer software used by organizations such as offices, businesses, schools, etc., to provide a variety of services such as business-oriented tools, payment processing systems, billing systems, security, content management, information technology (IT), communication and collaboration support, etc. In some examples, aspects of the enterprise software may be executed by cloud-native environments. In some examples, such services, referred to as cloud-based services or cloud services may be used for supporting electronic communication for an organization, e.g., in the form of text messages, e-mails, file transfers, etc.

In some examples, the cloud services may enable or support search functions for searching content in the electronic communication systems. For example, a message history maintained by a cloud service can be searched for occurrences and or contexts related to one or more words or phrases. However, the cloud services may be provided by a third party, outside a trusted network domain of the organization or individuals of the organization. Thus, for privacy and security concerns, the cloud services such as the electronic communications provided by the third parties may be encrypted to prevent direct access to underlying data by the third parties. For example, the message history for users of an organization may be stored in an encrypted format by the cloud services. However, such encryption places restrictions on the ability to support search functions for searching through the encrypted content.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
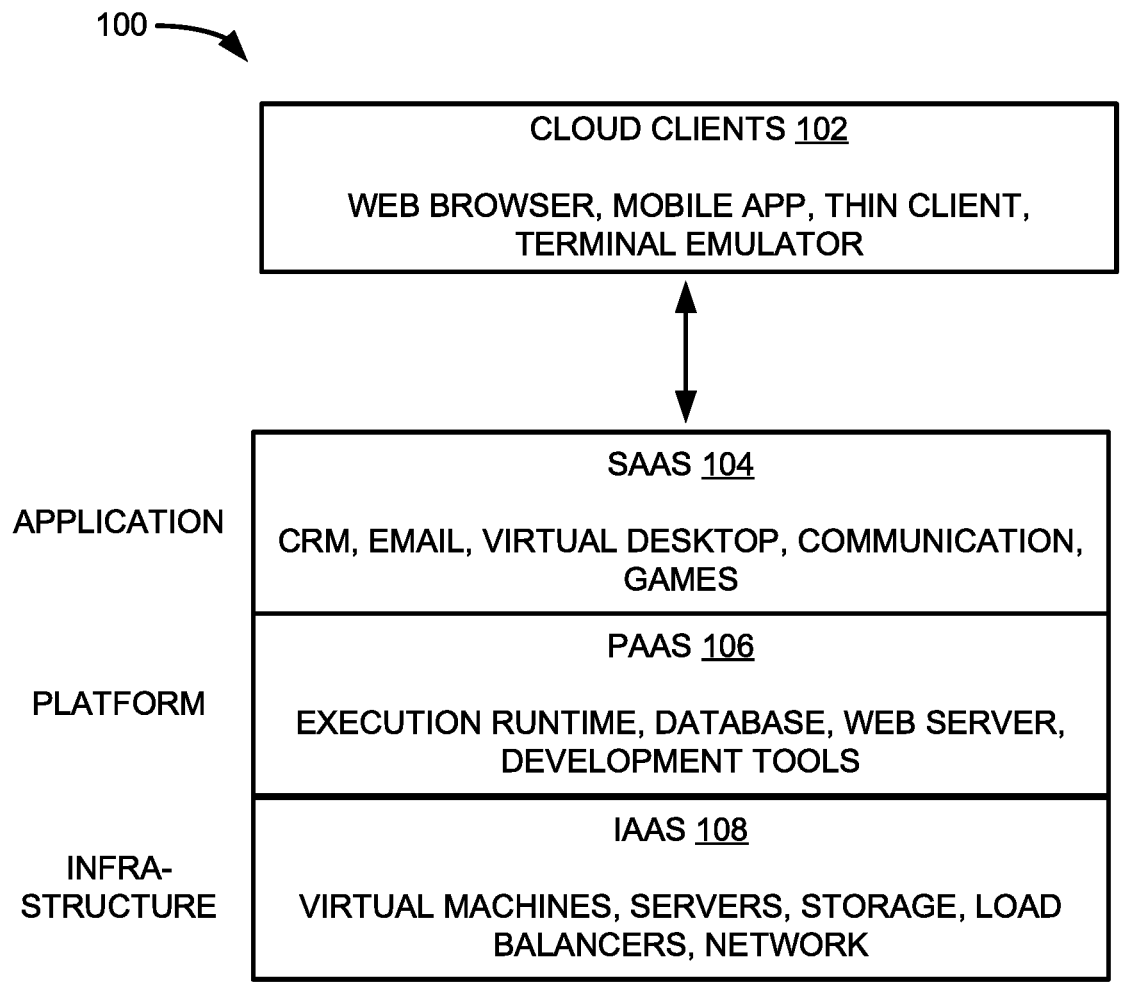
FIG. 1 illustrates a topology of cloud computing environment, in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, methods, and computer-readable media for schemes according to which, fuzzy searches can be performed on data stored in a cloud service or remote location, where the data is encrypted. In some examples, a method is provided. The method can involve maintaining, in an indexer, a log of unique words appearing in a message history and receiving a query comprising at least one search term from a user device, where the indexer may share a trusted domain with the user device, where in some examples, the indexer may be integrated in the user device. The method can involve performing a fuzzy search of the search term in the log to determine one or more matching words in the log, generating one or more search tokens from the one or more matching words, the one or more search tokens comprising encrypted versions of the one or more matching words, and providing the one or more search tokens to a search service for searching a database of encrypted words of the message history. In some examples, the at least one search term does not have an exact match with any of the words in the message history.

For example, systems, methods, and computer-readable media are disclosed for performing fuzzy-searches on encrypted messages. In some examples, a dictionary of words appearing in a message history is maintained in an indexer. Upon receiving a query including at least one search term, a fuzzy search of the dictionary is performed using the at least one search term to determine one or more fuzzy-matching words in the dictionary, and one or more search tokens are generated from the one or more fuzzy-matching words, the one or more search tokens including encrypted versions of the one or more fuzzy-matching words. The one or more search tokens are provided to a search service for searching a database of encrypted messages of the message history, where the at least one search term may not have an exact match with any of the words in the dictionary.

In some examples, a method is disclosed, where the method comprises maintaining, in an indexer, a dictionary of words appearing in a message history, receiving a query comprising at least one search term, performing a fuzzy search of the dictionary using the at least one search term to determine one or more fuzzy-matching words in the dictionary, generating one or more search tokens from the one or more fuzzy-matching words, the one or more search tokens comprising encrypted versions of the one or more fuzzy-matching words, and providing the one or more search tokens to a search service for searching a database of encrypted messages of the message history.

In some examples, a system is disclosed. The system can include one or more processors; and a non-transitory computer-readable storage medium containing instructions which, when executed on the one or more processors, cause the one or more processors to perform operations including: maintaining, in an indexer, a dictionary of words appearing in a message history; receiving a query comprising at least one search term; performing a fuzzy search of the dictionary using the at least one search term to determine one or more fuzzy-matching words in the dictionary; generating one or more search tokens from the one or more fuzzy-matching words, the one or more search tokens comprising encrypted versions of the one or more fuzzy-matching words; and providing the one or more search tokens to a search service for searching a database of encrypted messages of the message history.

In some examples, a non-transitory machine-readable storage medium is disclosed, including instructions configured to cause a data processing apparatus to perform operations including: maintaining, in an indexer, a dictionary of words appearing in a message history; receiving a query comprising at least one search term; performing a fuzzy search of the dictionary using the at least one search term to determine one or more fuzzy-matching words in the dictionary; generating one or more search tokens from the one or more fuzzy-matching words, the one or more search tokens comprising encrypted versions of the one or more fuzzy-matching words; and providing the one or more search tokens to a search service for searching a database of encrypted messages of the message history.

In some examples, the indexer shares a trusted domain with a user device from which the query is received.

In some examples, the at least one search term does not have an exact match with any of the words in the dictionary.

In some examples, the words in the dictionary are unencrypted, and obtained by unencrypting encrypted messages received from a user device.

Some examples further include maintaining pointers corresponding to the words in the dictionary, the pointers identifying contexts or locations in the message history of the words in the dictionary.

In some examples, the search tokens further include encrypted versions of the one or more pointers corresponding to the one or more fuzzy-matching words.

Some examples further include providing at least a portion of the dictionary to a user device.

Some examples further include enabling the user device to perform a fuzzy search on results of a search performed by the search service using the one or more search tokens.

Some examples further include excluding from the dictionary, one or more words having existing fuzzy-matches in the dictionary.

Some examples further include stemming the words in the dictionary.

DESCRIPTION OF EXAMPLE EMBODIMENTS

Disclosed herein are systems, methods, and computer-readable media for performing fuzzy searches in a database maintained by a third party service such as a cloud service. As previously mentioned, cloud services may be used for supporting various needs and functions of an organization. In some examples, a third party cloud service can support one or more databases, file storage systems, or other content storage systems for a customer (or more generally, a "user"). The user may include one or more individuals, a business, an organization, or any other entity in this disclosure. In some examples, the one or more databases can include databases related to a communication infrastructure. For example, a messaging provider can implement a cloud-based communication platform for electronic communication between one or more users or one or more members of a customer. The messaging provider can support a message services for an organization and can include a message history or other repository of electronic messages, files, documents, etc.

To protect the privacy of the user(s) and provide security (e.g., in the event of a breach at the messaging provider), the message history stored by the messaging provider may be encrypted in a manner which does not reveal the plaintext or context of words in the message history to the messaging provider. For example, in currently known and conventional implementations, the words appearing in the message history may be encrypted and the cloud service may maintain a database of unique encrypted words. The cloud service can also maintain associations to one or more contexts in which the encrypted words of the database appear in the message history. To search through this database using a search term, the search term may be encrypted using the same one or more encryption keys used for the encryption of the message history, and the database of the encrypted words may be searched using the encrypted search term. This way, if there is a match between the encrypted search term and one of the encrypted words in the database, the one or more contexts can be identified and revealed to a searcher. This process does not require exposing the unencrypted or raw words, the search terms, or their contexts to the cloud service, thus ensuring privacy and security. However, in these conventional implementations, searching through the message history requires an exact or verbatim match between the encrypted search term and one of the unique encrypted search terms.

However, a fuzzy search may be desirable in some cases, where searches can be supported for variations, misspellings, shortened or incomplete versions, etc., of the search term to be searched. The fuzzy search can allow searching the message history for occurrences of words with spellings which have a close but inexact match with the search term. For example, using a fuzzy search, a word misspelled as "colaboration" in the message history may be searched with the correctly spelled search term "collaboration", where it may be desirable to return the match to the incorrectly spelled word in the message history. In another example, a fuzzy search can also allow searching the message history using a partial search term. For example, a search term containing a partially spelled word "collab" may be searched in the message history, where it may be desirable to return results which contain the fully spelled word "collaboration" in the message history). However, due to the inherent restrictions imposed by the conventional implementations for the search terms to have exact matches with words in the message history, fuzzy searches may return incomplete and/or inaccurate results in conventional implementations.

In example aspects of this disclosure, systems and methods are described for supporting fuzzy searches on a database, where the database may be encrypted. In some examples, the database may be stored on a messaging provider, for example, provisioned as a cloud service. In some examples, the cloud service may not share a trust domain with a user, and the database may contain a message history, where at least portions of the message history may be relevant to a user. The database containing the message history, for example, may be encrypted to protect the user's privacy and security. The user may desire a search function to be supported on the message history, where the search function can include a fuzzy search.

In some examples, an indexer is provided, where the user and the indexer share a trusted domain. In some examples, the indexer can be implemented by a trusted third party, while in some examples, the indexer can be implemented by a user device (e.g., the indexer may be integrated in a user device). As messages are sent to/from the user, the indexer can receive and maintain a log of all words which appear across the messages in the message history of the user, for example. In some examples, the log contains unencrypted or plaintext versions of all the unique words which appear in the message history. The indexer may also maintain pointers to where the words in the log appear in the message history. The cloud service may store the encrypted message history as previously described.

In some examples, when the user or user device (or customer) initiates a query for searching a search term, the indexer may perform a fuzzy search on the words in the unencrypted log. For any one or more matching entries in the log, search tokens may be generated for searching in the database of encrypted words in the message provider. This way, a verbatim match is not necessary, as the indexer allows a fuzzy match to be performed on the unencrypted log first before the search token generation. The following sections provide additional details of the fuzzy search according to example aspects of this disclosure.

As used herein, the term "cloud service provider" (or simply "cloud provider") refers to an enterprise, entity, or individual that provides some component of cloud computing, such as, without limitation, Infrastructure as a Service ("IaaS"), Software as a Service ("SaaS"), Platform as a Service ("PaaS"), Communications as a Service ("CaaS"), Compute as a Service ("CompaaS"), Data Storage as a Service ("DsaaS"), Network as a Service ("NaaS"), Anything as a Service ("XaaS"), for example, to other enterprises, entities or individuals ("cloud users") in accordance with a Service Level Agreement ("SLA"). For example, a typical cloud storage SLA may specify levels of service, as well as the recourse or compensation to which the cloud user is entitled should the cloud service provider fail to provide the service as described in the SLA. Examples of cloud service providers include, but are not limited to, Amazon®, Google®, Citrix®, IBM®, Rackspace®, and Salesforce-.com®.

FIG. 1 illustrates an example cloud computing environment 100. Cloud computing can enable on-demand network access to a shared pool of configurable computing resources in a scalable, flexible, and resilient manner. Cloud service providers may offer services to cloud user devices 102, where the cloud user devices 102 can include, for example, web browsers, mobile applications, thin clients, terminals, emulators, etc. The cloud service may be provided according to different models which may offer different levels of abstraction. In the cloud computing environment 100, example models of cloud services are shown, including software as a service (SaaS) 104, platform as a service (PaaS) 106, and infrastructure as a service (IaaS) 108.

Cloud service providers using the SaaS 104 model may host an application and make it available to users through the internet, e.g., as a browser-based interface. Customers of the SaaS 104 model can utilize the software without requiring development, maintenance, support, update, or backups. The SaaS 104 model may be utilized for providing Customer Relationship Management (CRM) tools, messaging services such as email, instant messaging, and other communications, virtual desktop, online games, etc.

The PaaS 106 model may be used by software developers, as it supports coding, testing, and deploying functionality as software applications without requiring hardware-oriented tasks such as managing security patches and operating system updates. The PaaS 106 model also supports Application Programming Interfaces (APIs) and tools that enable developers to hook in features such as traffic splitting, monitoring, and version control systems. The PaaS 106 model may be utilized for providing platforms for execution runtime, database management, web servers, development tools, etc.

The IaaS 108 model allows deployment and management of pre-configured and virtualized hardware, which enables users to spin up virtual machines or computing power without the labor-intensive server management or hardware investments. The IaaS 108 model can provide storage, networking, servers, and virtualization components to users, while allowing the users to install and maintain the operating system, databases, security components for their applications. The IaaS 108 model may be utilized for providing infrastructure for virtual machines, servers, storage, load balancers, networks, etc.

Although the SaaS 104, PaaS 106, and IaaS 108 models are represented as layers in a stack, these models need not be related. For example, a program may be run on and accessed directly from the IaaS 108 without being wrapped as a SaaS 104. Similarly, a cloud provider may provide the SaaS 104 implemented on physical machines without utilizing the underlying PaaS 106 or IaaS 108 layers.

In some examples, the cloud provider may provide cloud APIs for accessing and managing cloud resources. The cloud APIs may be used for building and interacting with applications in the cloud computing environment. For example, the cloud APIs may allow software to request data and computations from one or more services through a direct or indirect interface. The cloud APIs may also expose their features via Simple Object Access Protocol ("SOAP"), Representational State Transfer ("REST"), Remoted Procedure Call ("RPC"), programming APIs, and others, for example. Vendor specific and cross-platform interfaces may be available for specific functions. Cross-platform interfaces enable applications to access services from multiple providers without having to be rewritten, but typically have less functionality than vendor-specific interfaces. IaaS APIs enable modification of resources available to operate an application in the IaaS 108 model. Functions of the IaaS APIs (or "infrastructure APIs") include provisioning and creation of components, such as virtual machines. The APIs for implementing the PaaS 106 (or "service APIs") provide an interface into a specific capability provided by a service explicitly created to enable that capability. Database, messaging, web portals, mapping, e-commerce and storage are all examples of service APIs. APIs for implementing the SaaS 104 (or "application APIs") provide mechanisms for interfacing with and extending cloud-based applications, such as CRM, Enterprise Resource Planning ("ERP"), social media, and help desk applications.

In cloud computing environments, a combination of one or more different types of computing services may be used, where the different types of computing services may have different resources, capabilities, security, privacy, etc. Among the different types of computing services, a public cloud service may provide cloud computing resources over a network that is open to the public. The resources of public cloud and the public network may not be trusted or secure from the perspective of a user (e.g., a user device, an organization, an individual, or enterprise) using the public cloud. Examples of public clouds include Amazon Web Services ("AWS"), Microsoft, and Google, where infrastructure is operated at respective data centers and access to these public clouds may be provided via the Internet or via a direct connect service offered by the respective cloud service provider.

In some examples, a private computing structure such as a private cloud may be provisioned for the use of a single organization or enterprise, where the private clouds may be managed internally or by a third party and hosted internally or externally. The private clouds may be within the trusted domain of the user device, and may offer greater security and privacy for the user's information.

In some examples, a combination of the public cloud and private computational resources may be utilized. For example, a user device may store sensitive user data on a private cloud application that is interconnected to a communication application provided on a public cloud as a software service on the SaaS 104 model, for example. In some examples, the private computational resources may be managed internally by the client, while in some examples, a private cloud may be provided for the private computational resources and hosted by a third party. The third party and the user device may share a trusted domain.

Figure 2A:
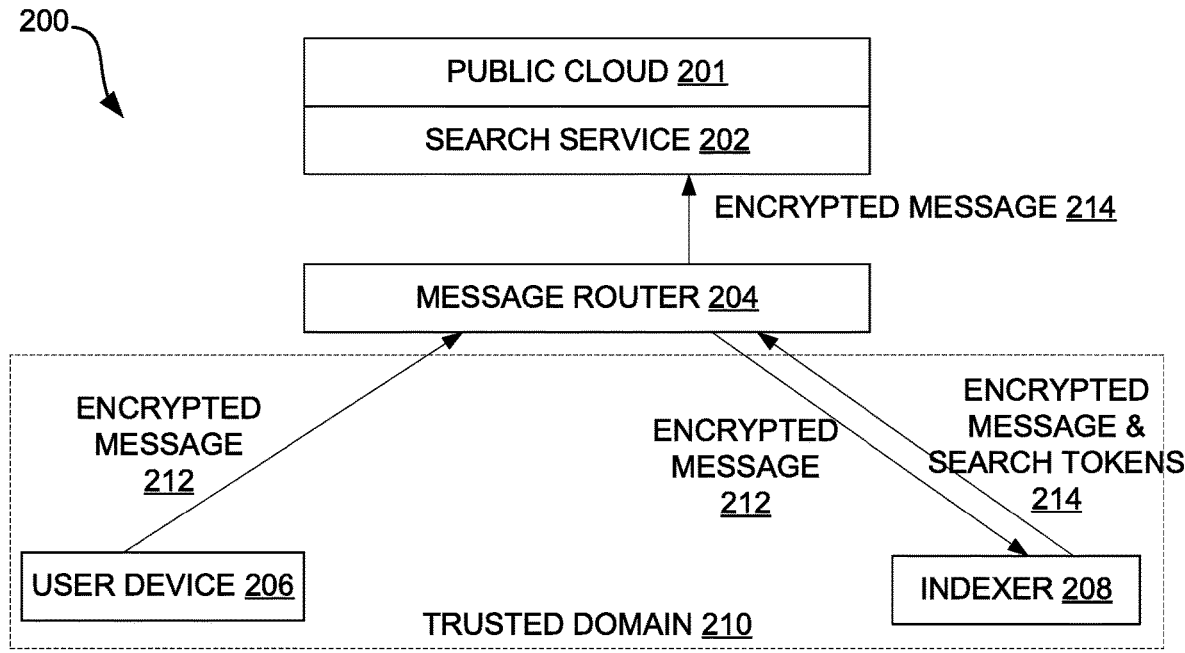
FIGS. 2A-B illustrate example aspects of a cloud computing environment with an indexer in a trusted domain for enabling a fuzzy search on an encrypted database provided outside the trusted domain, in accordance with some examples.

FIG. 2A illustrates an example computing environment 200, which may be utilized for a communication application provided by a public cloud 201 (e.g., according to the SaaS 104 model). The public cloud 201 may include data centers for storing information pertaining to one or more users, including a user device 206, where the user device 206 may include a device for an individual user, an organization, an enterprise, etc. In some aspects, the information related to the user device 206 can include a message history or other information which is sensitive or private to the user device 206. To enhance security and privacy of the information, the user device 206 may encrypt the information to be stored on the public cloud 201 and/or the public cloud 201 may store information pertaining to the user device 206 in an encrypted form, e.g., in an encrypted database. A search service 202 may be provided to search the encrypted database in the public cloud 201.

In conventional implementations for searching an encrypted database using a search term, only an exact or verbatim match for the search term may be returned, as previously explained. However, searches for the exact search term may not be sufficient for applications such as message histories, for example, because spelling errors or format inconsistencies are not tolerated by such strict requirements for verbatim match. Thus, the usability of the conventional search services is limited.

In order to enhance the functionality of the search service 202, an indexer 208 is provided in the example computing environment 200. In some examples, the indexer 208 may include computing resources provisioned as a private cloud by a trusted third party. The third party may be a contracted organization for providing secure communications for the user device 206, and different from the public cloud 201 in terms of the trust shared between the third party and the user device 206. In some examples, some or all of the functionality of the indexer 208 may be located within the user device 206, e.g., on one or more compute devices or a private cloud of the user device 206. In the various examples, the user device 206 and the indexer 208 may share a trusted domain 210, such that the indexer 208 may be trusted to store sensitive information of the user device 206. For example, the user device 206 need not encrypt a database such as a message history before it is exported to the indexer 208. In some examples, the indexer 208 can store an unencrypted version or plaintext of some or all of the words of the message history which is stored in the encrypted database of the public cloud 201.

Figure 2B:
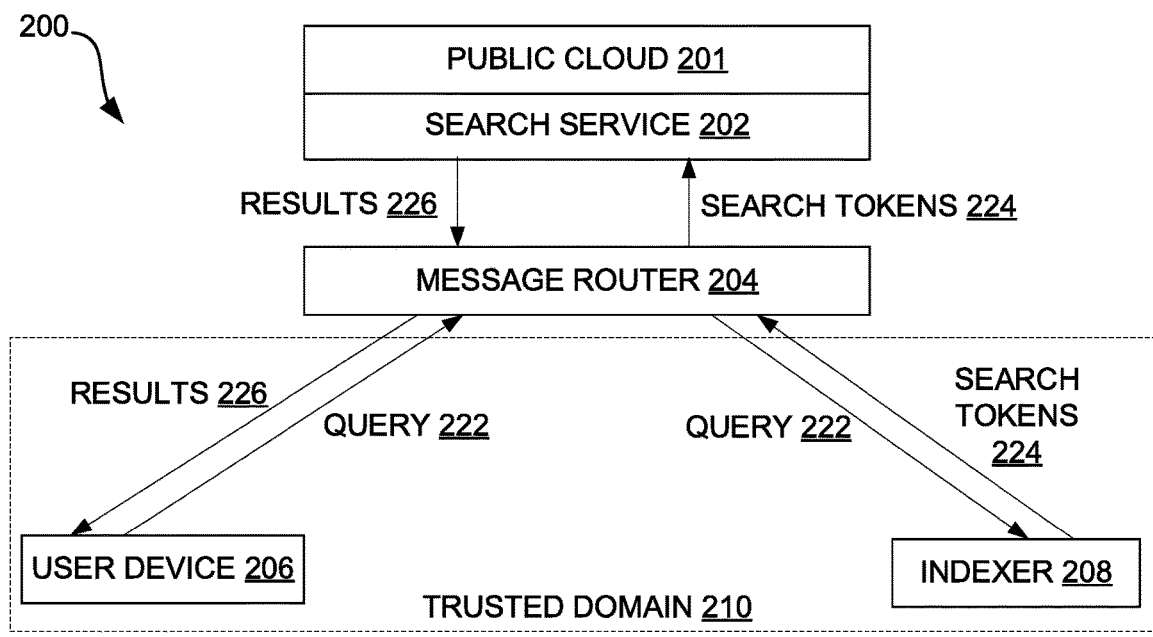

In one example, the indexer 208 is configured to build and maintain a database or log of all words that appear across all messages in the message history for the user device 206. The user device 206 may transmit an encrypted message 212 to be stored in the public cloud. In some examples, for each encrypted message 212 which is stored in the public cloud 201, a message router 204 is provided to route the encrypted message 212 to the indexer 208. While in some examples, the message router 204 can be maintained within the trusted domain 210, in other examples, the message router 204 can be outside the trusted domain 210, as shown in FIGS. 2A-B. In some examples the message router 204 need not be configured as a standalone entity, but may be provided as part of the public cloud 201.

In some examples, the indexer 208 builds an index or stem which provides pointers to one or more words which may be included in the encrypted message 212. In some examples, the indexer 208 can build the index using an unencrypted version of the encrypted message 212. In some examples, the indexer 208 can obtain the unencrypted version of the encrypted message 212 because the indexer 208 may be contained within the trusted domain 210. The pointers enable identifying a location or context where the one or more words may appear in a message history of all of the messages 212. The indexer 208 also adds the one or more words of the encrypted message 212 to a log or dictionary, where the dictionary contains unique words. Thus, if a word contained in the encrypted message 212 (including a misspelling/fuzzy match of a dictionary word) already exist in the dictionary, the indexer may not update the dictionary, but the indexer 208 may update the pointers to add an identification of the encrypted message 212 in addition to any previous messages in which the word appeared. In some examples, the pointers can be provided by the indexer 208 to the public cloud 201 or the search service 202 to be stored in the public cloud 201 or the search service 202, respectively. By adding the words to the dictionary in the above manner, the dictionary contains unique words and the indexer 208 uses the pointers to maintain associations of the unique words in the dictionary to all messages such as the encrypted message 212 in which each of the unique words appears. The unique words may be stored in an unencrypted or plaintext format in the dictionary. The pointers may also be maintained in an unencrypted format in the indexer 208.

It is noted that as the number of messages and words therein increase, the number of unique words stored in the dictionary can also increase. However, there may be repetitions in the words, so the size of the dictionary may not increase in proportion to all the words appearing in all the messages. It is also noted that the words in the messages may be variations of one another. For example, some unique words in the dictionary may be variants of other unique words. These variants may be due to spelling mismatches, format variations (e.g., upper case vs. lower case, abbreviations, short-form vs. long-form, etc.). In some cases, it may be desirable for a fuzzy search of a search term to result in a match with one or more variants of the search term. Since the indexer 208 can unencrypt the words of the encrypted message 212 and maintain the unique words from the encrypted message 212 in the dictionary in an unencrypted or plaintext format, it is possible to perform a fuzzy search against one or more variants of the search term which may have appeared in the message history, without requiring an exact match. A fuzzy search may be implemented by determining a distance (a vector in search algorithms) between two words and based on a predefined level of closeness between the two words, determining whether there is a match or not. The predefined level may be adjusted to be more inclusive or more exclusive. For example, if only a very close match is allowed, then only minor variants may be returned as a match (with the closest match being an exact match).

Accordingly, in some aspects, when the indexer receives the encrypted message 212, the indexer 208 may unencrypt the encrypted message and extract one or more words from the unencrypted version of the encrypted message 212 and update the dictionary with any words of the encrypted message 212 (or variants thereof) which have not previously appeared in the dictionary, and also update the pointers for all of the words of the encrypted message 212. In some examples, the indexer 208 can implement one or more policies for improving storage efficiency, search usefulness, and search speed on the dictionary. The one or more policies may be implemented in any suitable combination, where in some examples, the policies or combinations thereof may be configurable by the user device 206 and/or other user or administrator.

In one example policy, the indexer 208 may exclude stop words appearing in the encrypted message 212 from being stored in the dictionary. For example, stop words such as articles, prepositions, conjunctions, etc., may result in a large number of matches, which may not be meaningful or useful when conducting a search on a message history. Thus, the indexer 208 may improve efficiency by excluding such words from the dictionary. In some implementations, the indexer 208 may maintain pointers for words appearing in the dictionary, while words excluded from the dictionary are also not assigned pointers.

In another example policy, the indexer 208 may perform stemming on one or more words of the encrypted message 212, where stemming a word refers to storing a reduced or shortened version of the word. The stemming may be useful for longer words (e.g., of a length greater than 4 or more letters in one illustrative example), where a match on the stemmed version of the longer word may be sufficient to return a result for a search. For example, a word such as "intuition" may be reduced to its stem, "intui", when stored in the dictionary, such that a match may be provided against a search term "intuitive" as well as "intuition" or any other variant thereof.

In another example policy, the indexer 208 may exclude words appearing in the encrypted message 212 that are a fuzzy match to existing words in the dictionary. Thus, if a word in the encrypted message 212 is a misspelling or spelling variant of a word which is already in the dictionary, then the word in the encrypted message 212 may be excluded from being stored in the dictionary even if the word in the encrypted message 212 may be a unique word which does not exist in the dictionary. Since a subsequent fuzzy match for the word in the encrypted message 212 would result in a hit in the word already in the dictionary, storing the word in the encrypted message 212 would be unnecessary and redundant. However, to ensure that the context of the encrypted message 212 is also accounted for in a subsequent search, the indexer 208 may update the pointers to include a pointer to the encrypted message 212 even if the word in the encrypted message 212 is excluded from the dictionary.

In some examples, the indexer 208 may provide the dictionary constructed according to the one or more policies to the user device 206. In some examples, although the indexer 208 may be within the trusted domain 210 for the user device 206, the indexer 208 may also be used by one or more other users for similar purposes. Accordingly, the indexer 208 can maintain separate dictionaries for different users, and may provide a user-specific subset (e.g., based on the dictionary that the user device 206 is authorized to access) to the user device 206. Providing a dictionary or a portion thereof to the user device 206 can enable the user device to perform a fuzzy search and return any results to the indexer 208 for further processing.

Upon processing the encrypted message 212 as above (e.g., updating the dictionary and/or pointers) the indexer 208 can forward the encrypted message 212 along with any search tokens, along the path shown as encrypted message and search tokens 214. The search tokens will be explained further with reference to FIG. 2B. In some examples, the encryption used for encrypting messages such as the encrypted message 212, the encrypted message and search tokens 214, etc., may use encryption techniques with a message authentication code (MAC) for authenticating the encrypted messages. The message router 204 can forward the encrypted message and search tokens 214 to the public cloud 201, e.g., to be stored in the encrypted database, where the encrypted database may contain the encrypted message history with one or more encrypted messages obtained from the encrypted message and search tokens 214.

FIG. 2B illustrates aspects of the example computing environment 200 for processing search queries by the indexer 208 discussed with reference to FIG. 2A. In FIG. 2B, the user device 206 may generate a query 222 comprising one or more search terms. The message router 204 routes the query 222 to the indexer 208. For one or more search terms extracted from the query 222, the indexer 208 may perform a fuzzy search of the dictionary to identify one or more words in the dictionary that may match the one or more search terms in the query 222. For example, extracting the search terms from the query 222 may be consistent with the one or more policies used to construct the dictionary and/or the pointers as discussed with reference to FIG. 2A (e.g., stop words may be excluded, the search terms may be stemmed, etc.). In implementations wherein the user device 206 had been provided the dictionary, the user device 206 may perform the fuzzy search and send the resulting matches to the search service 202.

The indexer 208 may generate search tokens 224 for all words of the dictionary which fuzzy-match the search terms in the query 222. The search tokens 224 may include the fuzzy-matched words of the dictionary which are encrypted with the same encryption key and/or algorithm used in generating the encrypted message and search tokens 214. The search tokens 224 can also include the respective pointers corresponding to the encrypted fuzzy-matched words of the dictionary. The indexer 208 may route the search tokens 224 to the search service 202 through the message router 204. The indexer may also route the an address for the user device 206 to enable the search service 202 to identify the encrypted database in the public cloud 201 pertaining to the user device 206.

Upon receiving the search tokens 224, the search service 202 performs a search in the encrypted database using the search tokens 224 and returns results 226 to the user device 206. For example, the search service 202 can find one or more messages in the message history which match the search token 224 using the encrypted fuzzy-matched words and the pointers. The results 226 may also be encrypted and the message router 204 may route the results 226 to the user device 206, where the user device 206 may unencrypt the results 226 to obtain the results for the query 222.

In some examples, upon receiving the results 226 for the query 222 from the search service 202, the user device 206 may perform a local fuzzy search over the referenced content using the original query 222 in order to refine the results 226. For example, the search terms from the query 222 may be fuzzy-matched against the words in the results 226 as a sanity check, and if there are more matching results than expected, then the results may be narrowed down to the relevant results for the user device 206 at this stage.

Further, in implementations wherein the user device 206 has been provided the dictionary (or relevant portions thereof), the user device 206 may perform local fuzzy searches against the dictionary when the query 22 is generated, before the query 222 is sent to the indexer 208. In such cases, the user device 206 may be enabled to refine the resulting matches and make potential corrections to the query 222 before the query 222 is provided to the indexer 208. For example, if one or more search terms of the query 222 resulted in a match with a variant in the dictionary, then those search terms may be replaced by their variants in the dictionary. In some cases, the search terms may be replaced by their variants before a suitably modified query containing the variants is sent to the indexer 208.

In aspects of this disclosure, the above-described processes in FIGS. 2A and 2B need not be in any order, but can be independent. For example, the processes involved in building the dictionary and generating the pointers as discussed with reference to FIG. 2A can be conducted independently (including simultaneously) with the processes involved in conducting a fuzzy search as discussed with reference to FIG. 2B. In some examples, the dictionary can be populated in advance with some or all English language words (or other language if the messages are in a different language), which can reduce "noise" in populating and updating the dictionary. For example, if the words appearing initially in the dictionary are correctly spelled words, e.g., of the English language, then subsequent variants obtained from the encrypted message 212, if misspelled, or fuzzy, can be more efficiently handled.

Accordingly, example aspects of this disclosure enable fuzzy searches to be performed on encrypted content stored in the public cloud 201 without compromising security or privacy of the user device 206. For example, the plaintext and/or context of the search terms in the query 222 are not exposed to the public cloud 201 or the search service 202 which may exist outside the trusted domain 210. The dictionary of unencrypted words and pointers created by and/or maintained by the indexer 208 (or by the user device 206 in different implementations) within the trusted domain 210 allows fuzzy searching to be performed on the plaintext. For any matching words in the dictionary, the search tokens 224 provided to the search service 202 are encrypted and do not expose the plaintext or context of the search terms in the query 222. The user device 206 may perform a fuzzy search on the results 226 returned from the search service 202 based on the search tokens 224, thus providing an opportunity to refine the results 226.

Figure 3:
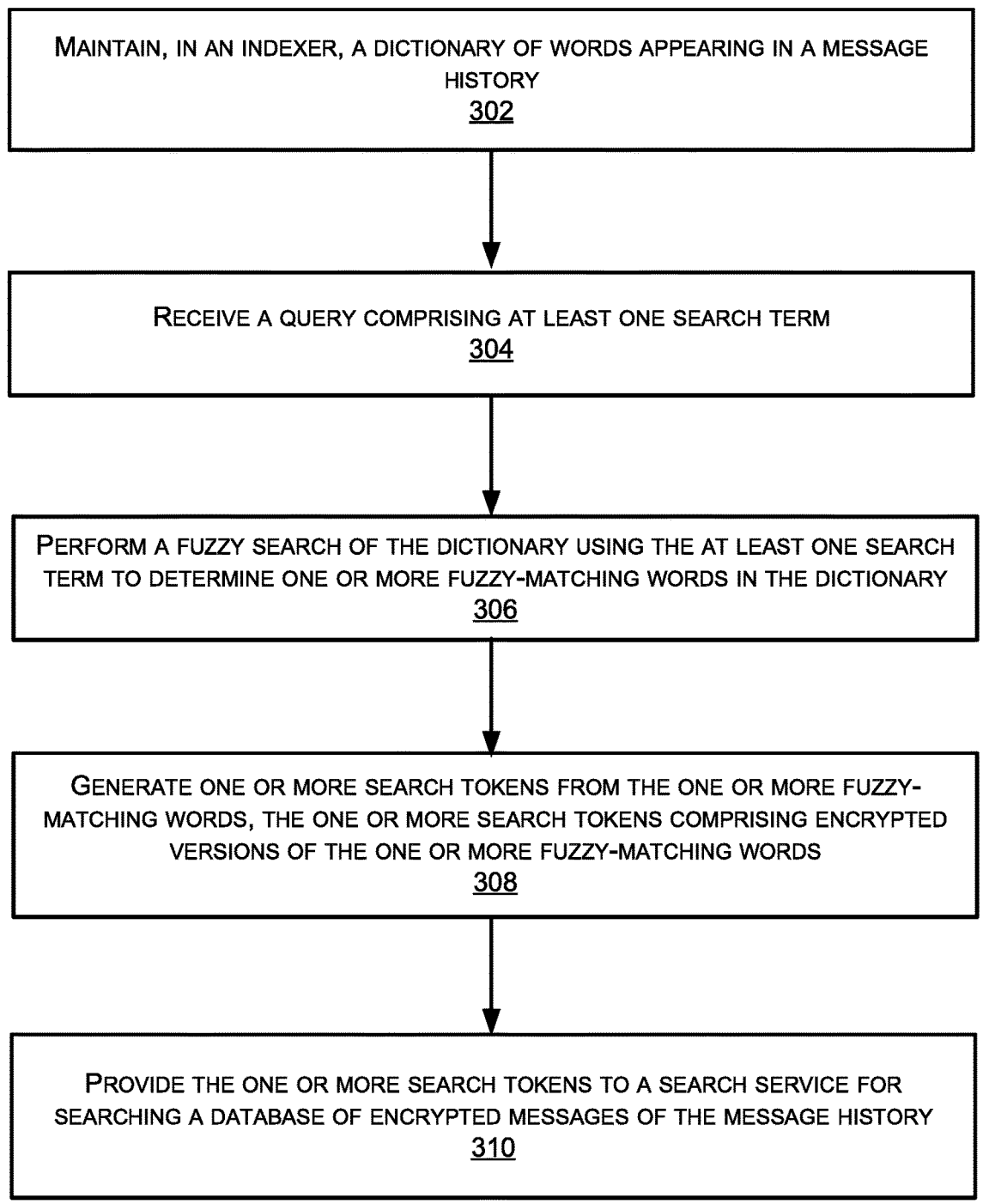
FIG. 3 illustrates an example method for performing fuzzy searches on an encrypted database, in accordance with some examples.

Having described example systems and concepts, the disclosure now turns to the method 300 illustrated in FIG. 3. The steps outlined herein are examples and can be implemented in any combination thereof, including combinations that exclude, add, or modify certain steps. The method 300 may be directed to processes for performing fuzzy-searches on an encrypted database.

At step 302, the method 300 can include maintaining, in an indexer, a dictionary of words appearing in a message history. For example, the indexer 208 unencrypt messages such as the encrypted message 212 received from the user device 206 residing in the trusted domain 210, and maintain a dictionary of unique words appearing in messages such as the encrypted message 212 received from the user device 206, the messages forming the message history. The words in the dictionary may be unencrypted or in plaintext format.

In some examples, the indexer 208 may implement one or more policies for updating the dictionary. For example, the indexer 208 may exclude from the dictionary, one or more words having existing fuzzy-matches in the dictionary. In some examples, the indexer 208 may exclude stop words from being stored in the dictionary. In some examples, the indexer 208 may implement stemming on at least some of the words stored in the dictionary. In some examples, the indexer 208 may implement a combination of one or more of such policies in maintaining and updating the dictionary.

In some examples, the indexer 208 may share the trusted domain 210 with the user device 206 from which the encrypted message 212 and any subsequent query 222 are received. The message history may be maintained in an encrypted form in the public cloud 201, where the search service 202 may be used to search the encrypted message history. The message router 204, the public cloud 201 and the search service 202 may be outside the trusted domain 210.

At step 304, the method 300 can include receiving a query comprising at least one search term. For example, the indexer 208 can receive the query 222 comprising one or more search terms. In some examples, at least one search term in the query 222 may not have an exact match with any of the words in the dictionary.

At step 306, the method 300 can include performing a fuzzy search of the dictionary using the at least one search term to determine one or more fuzzy-matching words in the dictionary. For example, the fuzzy-matching words can include words which are an inexact match or are variants of the at least one search term, with a distance for the fuzzy-matching being configurable.

At step 308, the method 300 can include generating one or more search tokens from the one or more fuzzy-matching words, the one or more search tokens comprising encrypted versions of the one or more fuzzy-matching words. For example, the indexer 208 may encrypt any fuzzy-matching words and form the search tokens 224 to be provided to the search service 202. In some examples, the indexer 208 may maintain pointers corresponding to the words in the dictionary, the pointers identifying contexts or locations in the message history of the words in the dictionary. In such cases, the search tokens can further include encrypted versions of the one or more pointers corresponding to the one or more fuzzy-matching words.

At step 310, the method 300 can include providing the one or more search tokens to a search service for searching a database of encrypted messages of the message history. For example, the indexer 208 can provide the search tokens 224 to the search service 202 to search the encrypted message history in the public cloud 201. The search can return the results 226 which may be used by the user device 206. In some examples, the user device 206 may be enabled to perform a fuzzy search on results 226 of a search performed by the search service 202 using the one or more search tokens 224. For example, the indexer 208 may provide at least a portion of the dictionary to the user device 206, whereupon the user device 206 may perform a fuzzy search on the results 226 to refine the results.

Figure 4:
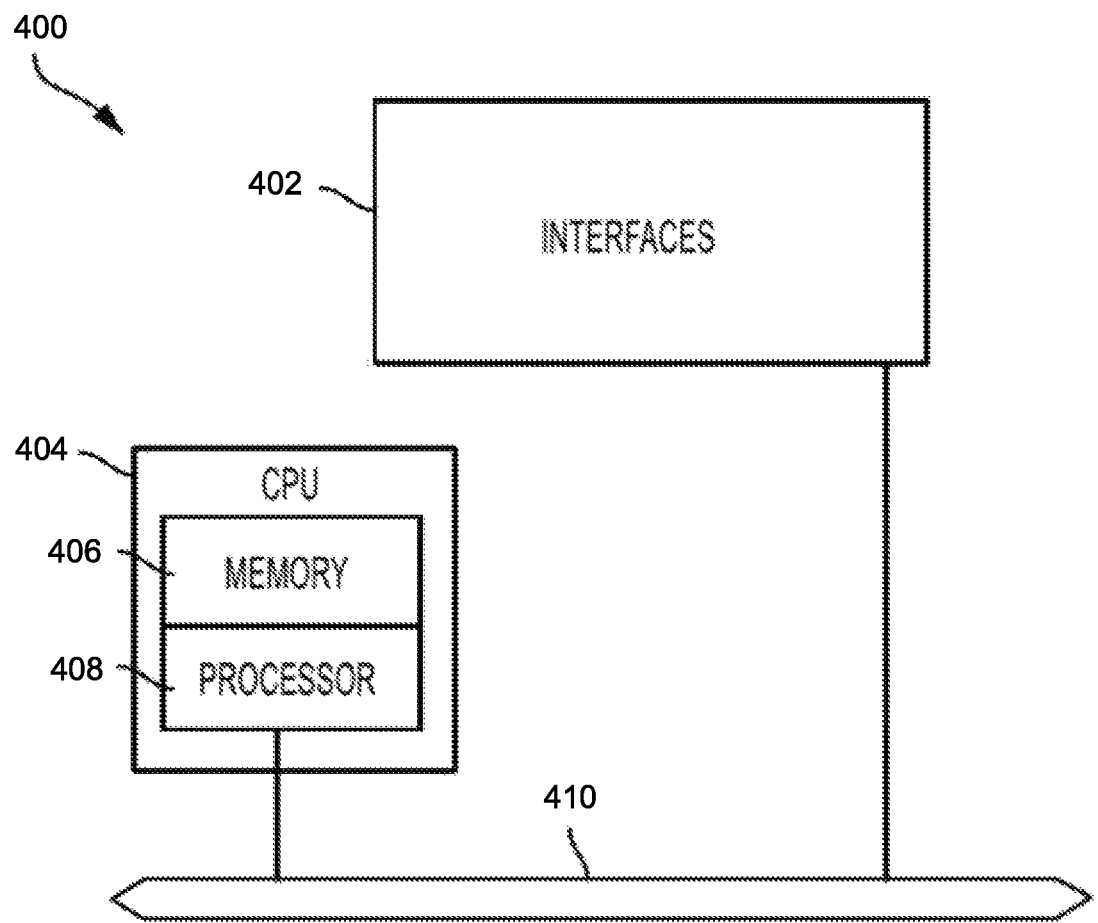
FIG. 4 illustrates an example network device, in accordance with some examples.

FIG. 4 illustrates an example network device 400 suitable for implementing the aspects according to this disclosure. In some examples, the indexer 208 and/or the user device 206 may be implemented according to the configuration of the network device 400. The network device 400 includes a central processing unit (CPU) 404, interfaces 402, and a connection 410 (e.g., a PCI bus). When acting under the control of appropriate software or firmware, the CPU 404 is responsible for executing packet management, error detection, and/or routing functions. The CPU 404 preferably accomplishes all these functions under the control of software including an operating system and any appropriate applications software. The CPU 404 may include one or more processors 408, such as a processor from the INTEL X86 family of microprocessors. In some cases, processor 408 can be specially designed hardware for controlling the operations of the network device 400. In some cases, a memory 406 (e.g., non-volatile RAM, ROM, etc.) also forms part of the CPU 404. However, there are many different ways in which memory could be coupled to the system.

The interfaces 402 are typically provided as modular interface cards (sometimes referred to as "line cards"). Generally, they control the sending and receiving of data packets over the network and sometimes support other peripherals used with the network device 400. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 404 to efficiently perform routing computations, network diagnostics, security functions, etc.

Although the system shown in FIG. 4 is one specific network device of the present technologies, it is by no means the only network device architecture on which the present technologies can be implemented. For example, an architecture having a single processor that handles communications as well as routing computations, etc., is often used.

Further, other types of interfaces and media could also be used with the network device 400.

Regardless of the network device's configuration, it may employ one or more memories or memory modules (including memory 406) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 406 could also hold various software containers and virtualized execution environments and data.

The network device 400 can also include an application-specific integrated circuit (ASIC), which can be configured to perform routing and/or switching operations. The ASIC can communicate with other components in the network device 400 via the connection 410, to exchange data and signals and coordinate various types of operations by the network device 400, such as routing, switching, and/or data storage operations, for example.

Figure 5:
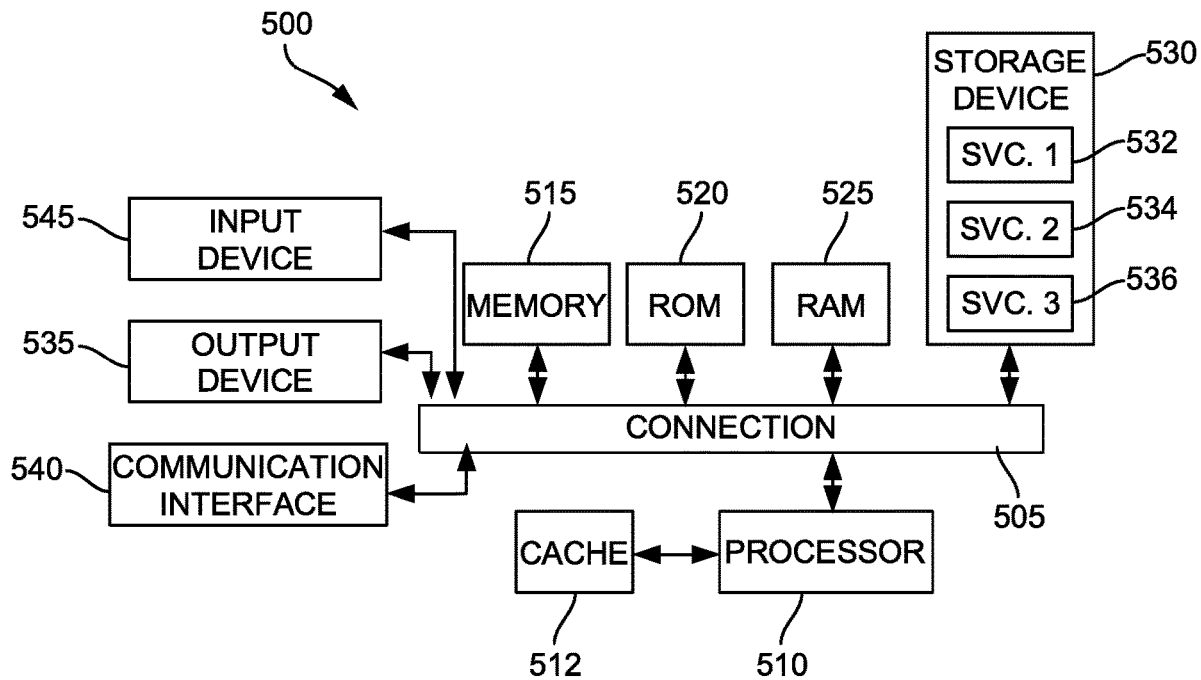
FIG. 5 illustrates an example computing device architecture, in accordance with some examples.

FIG. 5 illustrates an example computing device architecture 500 of an example computing device which can implement the various techniques described herein. The components of the computing device architecture 500 are shown in electrical communication with each other using a connection 505, such as a bus. The example computing device architecture 500 includes a processing unit (CPU or processor) 510 and a computing device connection 505 that couples various computing device components including the computing device memory 515, such as read only memory (ROM) 520 and random access memory (RAM) 525, to the processor 510.

The computing device architecture 500 can include a cache of high-speed memory connected directly with, in close proximity to, or integrated as part of the processor 510. The computing device architecture 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other computing device memory 515 may be available for use as well. The memory 515 can include multiple different types of memory with different performance characteristics. The processor 510 can include any general purpose processor and a hardware or software service, such as service 1 532, service 2 534, and service 3 536 stored in storage device 530, configured to control the processor 510 as well as a special-purpose processor where software instructions are incorporated into the processor design. The processor 510 may be a self-contained system, containing multiple cores or processors, a bus, memory controller, cache, etc. A multi-core processor may be symmetric or asymmetric.

To enable user interaction with the computing device architecture 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art, such as a display, projector, television, speaker device, etc. In some instances, multimodal computing devices can enable a user to provide multiple types of input to communicate with the computing device architecture 500. The communications interface 540 can generally govern and manage the user input and computing device output. There is no restriction on operating on any particular hardware arrangement and therefore the basic features here may easily be substituted for improved hardware or firmware arrangements as they are developed.

The storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof. The storage device 730 can include the services 532, 534, 536 for controlling the processor 710. Other hardware or software modules are contemplated. The storage device 530 can be connected to the computing device connection 505. In one aspect, a hardware module that performs a particular function can include the software component stored in a computer-readable medium in connection with the necessary hardware components, such as the processor 510, connection 505, output device 535, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
    receiving a query comprising at least one search term;
    determining, based on a fuzzy search of words from a message history and the at least one search term, one or more words from the message history;
    generating one or more search tokens from the one or more words, the one or more search tokens comprising encrypted versions of the one or more words and one or more pointers identifying locations or contexts of the one or more words; and
    providing the one or more search tokens to a search service.

2. The method of claim 1, wherein the determining the one or more words from the message history is based on a match between the words from a message history and the at least one search term.

3. The method of claim 2, wherein the match is a partial match or variant of the one or more words.

4. The method of claim 1, wherein a dictionary stores the words from the message history.

5. The method of claim 4, further comprising:
    updating the dictionary by including new words not currently in the dictionary or excluding words that are already stored in the dictionary.

6. The method of claim 4, further comprising:
    stemming the words from the message history.

7. The method of claim 1, wherein words from the message history are encrypted.

8. The method of claim 1, wherein the one or more words are unencrypted, and obtained by unencrypting encrypted messages received from a user device.

9. The method of claim 1, further comprising:
    enabling a user device to perform a fuzzy search on results of a search using the one or more search tokens.

10. The method of claim 1, further comprising:
    encrypting the one or more search tokens for sending to the search service, wherein the search service is configured to search a database of encrypted messages of the message history.

11. A system comprising:
    one or more processors; and
    a non-transitory computer-readable storage medium containing instructions which, when executed on the one or more processors, cause the one or more processors to perform operations including:

receive a query comprising at least one search term;

determine, based on a fuzzy search of words from a message history and the at least one search term, one or more words from the message history;

generate one or more search tokens from the one or more words, the one or more search tokens comprising encrypted versions of the one or more words and one or more pointers identifying locations or contexts of the one or more words; and provide the one or more search tokens to a search service.

12. The system of claim 11, wherein the determining the one or more words from the message history is based on a match between the words from a message history and the at least one search term.

13. The system of claim 12, wherein the match is a partial match or variant of the one or more words.

14. The system of claim 11, wherein a dictionary stores the words from the message history.

15. The system of claim 14, further comprising instructions, which when executed by the at least one processor, causes the at least one processor to:

update the dictionary by including new words not currently in the dictionary or excluding words that are already stored in the dictionary.

16. The system of claim 14, further comprising instructions, which when executed by the at least one processor, causes the at least one processor to:

stem the words from the message history.

17. The system of claim 11, wherein words from the message history are encrypted.

18. The system of claim 11, wherein the one or more words are unencrypted, and obtained by unencrypting encrypted messages received from a user device.

19. The system of claim 11, further comprising instructions, which when executed by the at least one processor, causes the at least one processor to:

enable a user device to perform a fuzzy search on results of a search using the one or more search tokens.

20. A non-transitory machine-readable storage medium, including instructions which when executed by at least one processor, causes the at least one processor to:

receive a query comprising at least one search term;

determine, based on a fuzzy search of words from a message history and the at least one search term, one or more words from the message history;

generate one or more search tokens from the one or more words, the one or more search tokens comprising encrypted versions of the one or more words and one or more pointers identifying locations or contexts of the one or more words; and provide the one or more search tokens to a search service.

* * * * *